United States Patent [19]

Jonsson

[11] Patent Number: 5,050,380

[45] Date of Patent: Sep. 24, 1991

[54] MEANS FOR RECEIVING AND SUBSEQUENTLY EMPTYING HYDRAULIC FLUID FROM A HYDRAULIC SYSTEM

[75] Inventor: Allan Jonsson, Kil, Sweden

[73] Assignee: Kamyr Aktiebolag, Karlstad, Sweden

[21] Appl. No.: 569,444

[22] Filed: Aug. 20, 1990

[30] Foreign Application Priority Data

Sep. 1, 1989 [SE] Sweden ............................. 8902892

[51] Int. Cl.[5] ............................................ F16D 31/02

[52] U.S. Cl. ........................................ 60/413; 60/455; 91/6; 91/417 R; 417/402; 417/349

[58] Field of Search ................. 60/413, 455, 461, 462, 60/470, 494; 91/417 R, 52, 6; 417/349, 402

[56] References Cited

U.S. PATENT DOCUMENTS

| | | | |
|---|---|---|---|
| 2,001,620 | 5/1935 | Levy | 60/413 |
| 2,147,536 | 2/1939 | Levy | 60/413 |
| 3,065,573 | 11/1962 | Goldberg | 60/413 X |
| 4,142,368 | 3/1979 | Mantegani | 60/413 |
| 4,229,143 | 10/1980 | Pucher et al. | 417/402 X |
| 4,424,673 | 1/1984 | Polanski et al. | 60/494 X |
| 4,552,327 | 11/1985 | Carter | 60/413 X |

FOREIGN PATENT DOCUMENTS

| | | | |
|---|---|---|---|
| 945870 | 4/1974 | Canada | 60/413 |
| 905056 | 1/1945 | France | 60/461 |
| 575915 | 4/1958 | Italy | 417/402 |
| 53320 | 6/1967 | Poland | 60/455 |
| 548727 | 3/1977 | U.S.S.R. | 60/413 |
| 550417 | 1/1943 | United Kingdom | 60/455 |
| 1509511 | 5/1978 | United Kingdom | 60/413 |

OTHER PUBLICATIONS

Fluid Pressure Boosters, All Pages Mar., 1959, Bulletin of Flick-Reedy Corp., Copy in 60/413.

*Primary Examiner*—Edward K. Look
*Assistant Examiner*—Todd Mattingly
*Attorney, Agent, or Firm*—Cushman, Darby & Cushman

[57] ABSTRACT

A means for receiving and subsequently emptying hydraulic fluid from a hydraulic system is described. It comprises a working cylinder (1) and a supply conduit (8) disposed between a pump and the working cylinder for supplying hydraulic fluid at high pressure within a predetermined interval. According to the invention the means also comprises a receiving cylinder (12) with a piston (19), which on one side defines a liquid space (22) for the receipt of hydraulic fluid from the working cylinder with an emptying pressure essentially lower than said high pressure, the piston (19) on the other side defines a chamber (21) containing gas at low pressure, and a high-pressure cylinder (13), which has a liquid space (28) and a plunger (30) movable therein, said liquid space (28) being connected to said supply conduit (8) to receive and return hydraulic fluid at high pressure therefrom and thereto, respectively. A piston rod (31) is disposed between the plunger (30) and the piston (19) to transmit movements from the plunger (30) to the piston (19) and reversed. Furthermore, the area of the piston (19) which is pressure-influenced by hydraulic fluid is essentially greater than the area of the plunger which is pressure-influenced by hydraulic fluid.

11 Claims, 5 Drawing Sheets

MEANS FOR RECEIVING AND SUBSEQUENTLY EMPTYING HYDRAULIC FLUID FROM A HYDRAULIC SYSTEM

FIELD AND BACKGROUND OF THE INVENTION

In a hydraulic system which comprises a working cylinder and a supply conduit disposed between a pump and the working cylinder for supplying hydraulic fluid at high pressure within a predetermined interval, the piston rod of the working cylinder performs a rapid stroke, causing a large flow of hydraulic fluid to be produced, which is pressed out of the working cylinder from its piston side into a low-pressure accumulator for temporary collection therein until said piston rod reverses to perform a slower stroke. Such a low-pressure accumulator operates with a gas chamber which is placed under relatively high pressure and it must therefore be designed in accordance with stipulated standards for pressure vessels with associated need to be approved for use as a pressure vessel. Another drawback is that gas may leak from the gas chamber, mixing with the hydraulic fluid and causing disturbance in operation.

SUMMARY OF THE INVENTION

The object of the present invention is to eliminate the low-pressure accumulator previously used, thus avoiding any problems with gas leakage and reducing the need for the receiving cylinder to be approved as a pressure vessel, and, furthermore, improving the pumping effect of the hydraulic system.

The present invention relates to a means for receiving and subsequently emptying hydraulic fluid from a hydraulic system comprising a working cylinder; a supply conduit disposed between a pump and the working cylinder for supplying hydraulic fluid at high pressure within a predetermined interval; a receiving cylinder with a piston which on one side defines a space for the receipt of hydraulic fluid from said working cylinder with an emptying pressure essentially lower than said high pressure, and on the other side defines a chamber containing gas at low pressure; a high-pressure cylinder with a liquid space and a device movable therein to alter the liquid volume, said liquid space being connected to said supply conduit to receive and return hydraulic fluid at high pressure therefrom and thereto, respectively; and a piston rod disposed between said liquid volume altering device in said high-pressure cylinder and said piston in said receiving cylinder to transmit movements from said liquid volume altering device to said piston and reversed, the area of said piston in said receiving cylinder which is pressure-influenced by hydraulic fluid, being essentially greater than the area of said liquid volume altering device which is pressure-influenced by hydraulic fluid.

BRIEF DESCRIPTION OF THE DRAWINGS

The invention will be described further in the following with reference to the drawings, in which.

DESCRIPTION OF ILLUSTRATED EMBODIMENT

Figure 1:
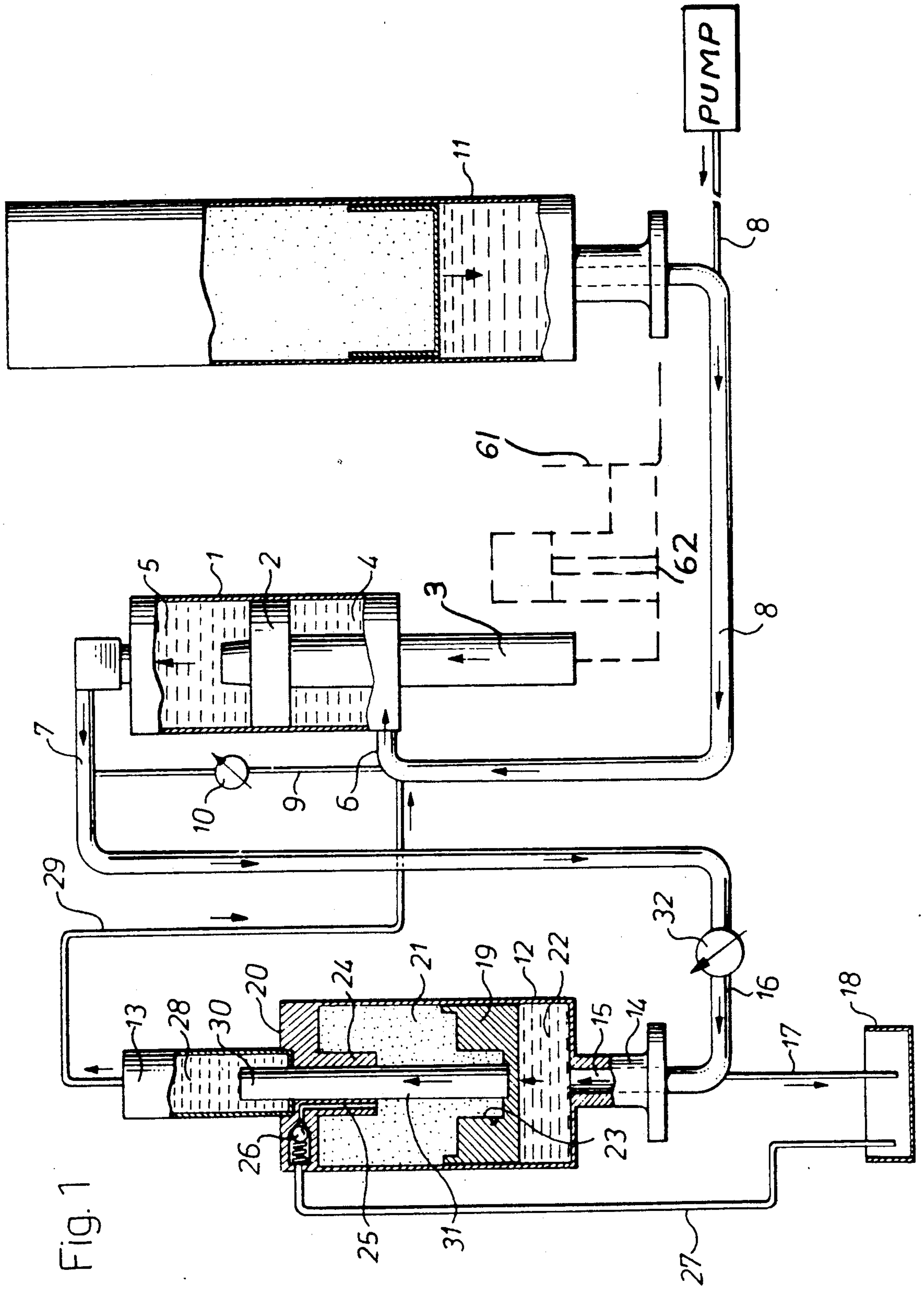
FIG. 1 is a diagram of connections for a hydraulic system according to a first application of a means in accordance with the present invention, and illustrates the flow directions when the piston rod of a working cylinder performs a rapid stroke.
Figure 2:
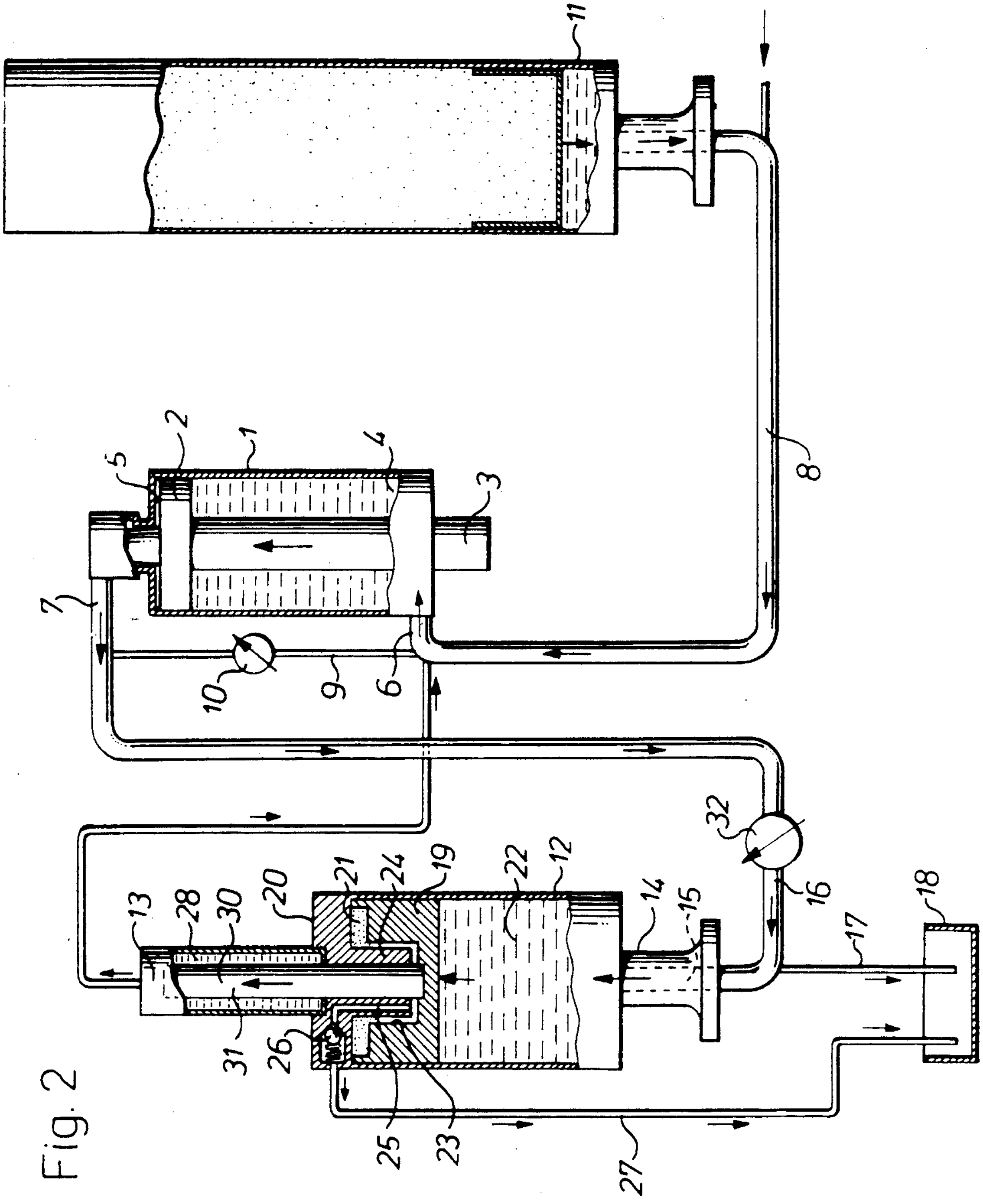
FIG. 2 shows the diagram of connections according to FIG. 1 in an end stage of the rapid stroke of the piston rod.
Figure 3:
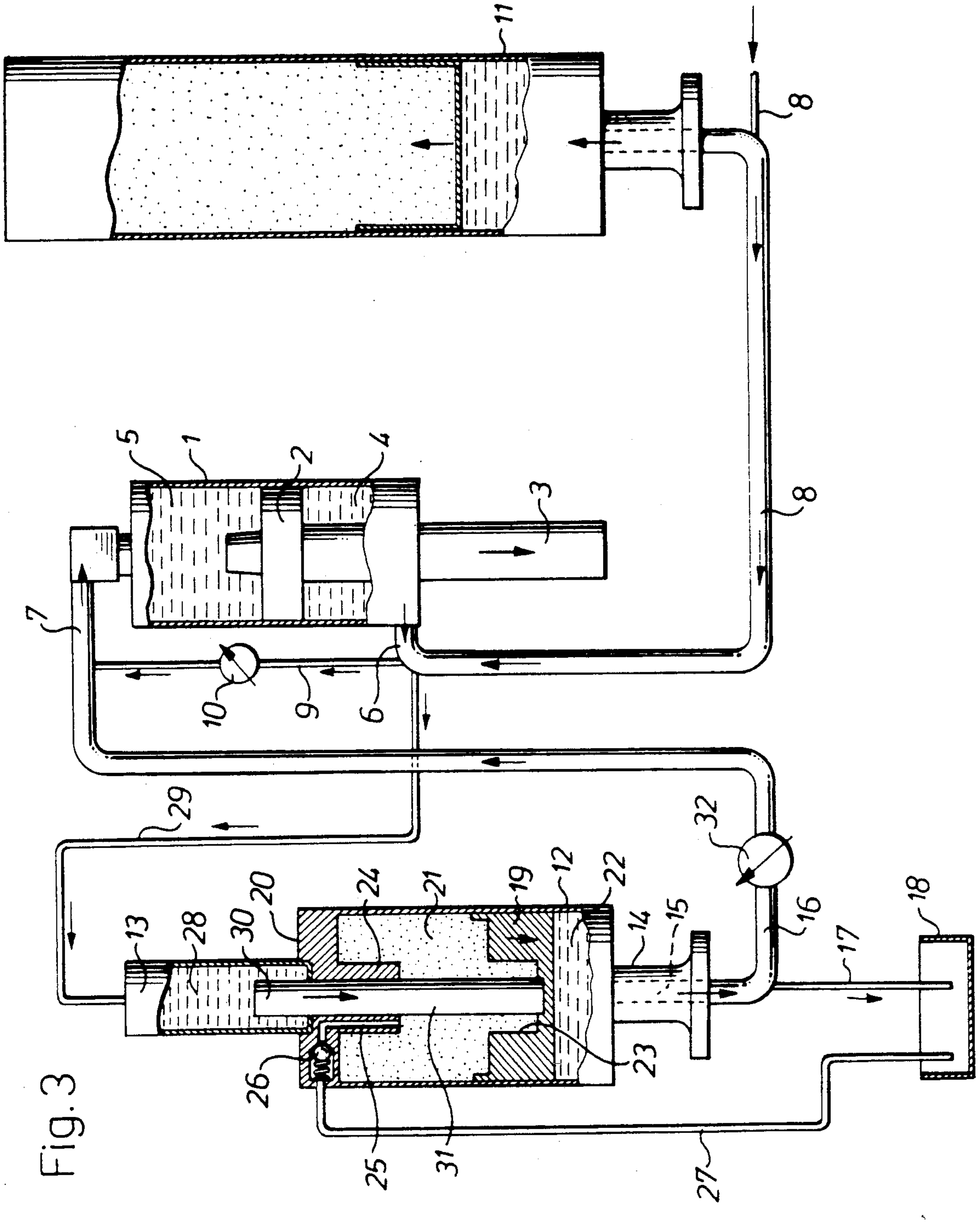
FIG. 3 shows the diagram of connections according to FIG. 1, and illustrates the flow directions when the piston rod performs its slow stroke in the opposite direction.

With reference to FIGS. 1–3, it is shown therein a diagram of connections for a hydraulic system in accordance with a first application of the present invention. The hydraulic system comprises a working cylinder 1 in the form of a differential cylinder having a piston 2 and a piston rod 3 protruding from one end of the working cylinder 1 and arranged to perform a first rapid stroke (in accordance with FIGS. 1 and 2) and a second, slow stroke in the opposite direction (in accordance with FIG. 3). The piston rod 3 may be connected, for instance, to a movable screen 61 in a diffuser 61 used with or without overpressure within the pulp industry, to move the screen in a slow movement and a rapid movement in the opposite direction.

The piston 2 divides the working cylinder 1 into a first side 4 and a second side 5. The working cylinder 1 is provided with a first conduit 6 connected to said first side 4, and a second conduit 7 connected to said second side 5.

The working cylinder 1 is provided with hydraulic fluid of high pressure via a supply conduit 8 connected to a pump, not shown indicated schematically by the box 8*a* , which pumps hydraulic fluid into the hydraulic system so that a high pressure within a predetermined interval is maintained. Further, a by-pass 9 provided with a valve IQ is disposed between the first and second conduits 6, 7 of the working cylinder 1 so that the two sides 4, 5 of the working cylinder 1 can be connected with each other to effect pressure equalization, whereby the piston rod 3 performs its other slow stroke in accordance with FIG. 3. During the rapid stroke in accordance with FIGS. 1 and 2, the valve 10 in the by-pass 9 is kept closed.

The hydraulic system also includes a high-pressure accumulator 11, which is connected to the supply conduit 8. The high-pressure accumulator 11 may be of any suitable design.

According to the invention a special means is connected to the hydraulic system to receive and thereafter empty hydraulic fluid therefrom. The means comprises a receiving cylinder 12 and a high-pressure cylinder 13 which cooperate with each other and are axially aligned with each other to form a functional unit. The end portion 14 of the receiving cylinder 12, facing away from the high-pressure cylinder 13, is provided with an opening 15 which is connected by a drainage conduit 16 to said second side 5 of the working cylinder 1 via said second conduit 7. The conduit 16 is provided with a valve 32. Further, the opening 15 is connected to a discharge conduit 17 for emptying hydraulic fluid from the receiving cylinder 12 into a tank 18 when the piston rod 3 of the working cylinder 1 performs its second, slow stroke as illustrated in FIG. 3. A piston 19 is disposed in the receiving cylinder 12 for displacement between specific end positions. The receiving cylinder 12 is closed at its end facing the high-pressure cylinder 13, by means of a rigid end wall 20. Said piston 19 and the end wall 20 define therebetween a chamber 21 the volume of which being variable. The chamber 21 contains a gas, usually air, under low pressure, which alters dependent on the position of the piston 19 in the receiving cylinder 12. On the other side the piston 19 and the end section 14 define therebetween a space 22 for the receipt of the relatively large quantity of hydraulic fluid which is pressed in from the working cylinder 1 in a short period of time during its rapid stroke as illustrated in FIGS. 1 and 2, while the piston 19 is forced towards its end position in the vicinity of the end wall 20 (without contact). A central recess 23 is provided on the side of the piston 19 facing the chamber 21, to collect any hydraulic fluid which may leak into the gas chamber 21 from the space 22 filled with hydraulic fluid. The end wall 20 is provided internally with an axial throttle ring 24. The recess 23 of the piston 19 and throttle ring 24 are adapted to each other so that the throttle ring 24 is received in the recess 23 when the piston 19 is forced in the direction to the end wall 20, thereby generating an increasing pressure on the leakage liquid collected in the recess 23. A system of channels 25 is disposed in the throttle ring 24 and the end wall 20 to remove the leakage liquid from the recess 23 when the leakage liquid is placed under increasing pressure. The channel system 25 may include two or more axial channels in the throttle ring 24, for instance, which are connected via an annular channel to an outlet channel in the end wall 20. A nonreturn valve 26 is disposed in the channel system 25, e.g. in said outlet channel. The channel system 25 communicates with the tank 18 via a conduit 27.

The maximum volume of hydraulic fluid which can be forced into the receiving cylinder 12 from the working cylinder 1 via the conduit 7 and drainage conduit 16 is so limited that the piston 19 will stop a short distance from the end wall 20 in its uppermost position, in order to prevent mechanical contact between the piston 19 and end wall 20.

The high-pressure cylinder 13 is rigidly mounted to the receiving cylinder 12 so that their centre lines coincide or substantially coincide. The high-pressure cylinder 13 may be provided, for instance, with a flange which is screwed to a closure on the receiving cylinder 12 in order to form a unitary end wall construction 20. The flange may include said outlet channel and annular channel of the channel system 25 for leakage liquid.

The high-pressure cylinder 13 has a space 28 for hydraulic fluid under high pressure. The liquid space 28 of the high-pressure cylinder is in continuous communication with the supply conduit 8 of the hydraulic system via a conduit 29.

The means according to the invention also comprises a device 30 for altering the liquid volume. The device 30 is disposed to be displaced to and for in the high-pressure cylinder 13 to alternately decrease and increase the volume of the liquid space 28 of the high-pressure cylinder 13, depending on the first and second strokes of the working cylinder 1 and the movements of the piston 19. The device 30 and piston 19 in the receiving cylinder 12 are arranged to cooperate with each other through a piston rod 31 so that displacement of the piston 19 in the direction to the high-pressure cylinder 13, caused by hydraulic fluid being pumped into the liquid space 22 of the receiving cylinder 12, will result in a corresponding displacement of the device 30 for altering the liquid volume, and so that a displacement of the device 30 for altering the liquid space in the direction to the receiving cylinder 12, caused by hydraulic fluid being pumped into the liquid space 28 of the high-pressure cylinder 13, will result in a corresponding displacement of the piston 19.

According to a preferred embodiment of the device 30 for altering the liquid volume, it consists of a circular rod or plunger having smaller diameter than the cylindrical liquid space 28 of the high-pressure cylinder 13, so that a slot is formed around the plunger. Alternatively, the plunger 30 has a diameter which is only slightly smaller than the diameter of the liquid space 28, in which case seals are disposed at the sliding surfaces. As is clear from the drawings, the plunger 30 and piston rod 31 may comprise one and the same construction element without visible transition between the two functional parts. The unit of plunger 30 and piston rod 31 is slidably journalled in the end wall 20 of the receiving cylinder 12 and is sealed with suitable seals. The hydraulic fluid from the high-pressure cylinder 13 which may leak past these seals is collected in the recess 23 of the piston 19 and is removed with the other leakage liquid as described earlier. The piston rod 31 may suitably abut freely against the piston 19 without mechanical connection therebetween.

According to an alternative embodiment of the invention, the device for altering the liquid volume may constitute a piston which is carried by the piston rod 3 of the receiving cylinder 12. In this case, however, a gas space is formed behind the piston similar to that in the receiving cylinder 12.

FIGS. 1 and 2 show the working cylinder 1 as the piston rod 3 thereof performs its first, rapid stroke. The valve 32 in the drainage conduit 16 is open, whereas the valve 10 in the by-pass 9 is kept closed. Hydraulic fluid flows in the directions indicated by arrows, and is forced into the working cylinder 1 from the supply conduit 8 by the actions of the pump and the high-pressure accumulator 11, but also from the high-pressure cylinder 13 via the conduit 29 by the action of the plunger 30 which in turn is influenced mechanically by the piston 19 and piston rod 31 of the receiving cylinder 12 and hydraulically by the force against the piston 19 which is developed in the liquid space 22 of the receiving cylinder 13 by the hydraulic fluid which is being simultaneously pumped in from said other side 5 (piston side) of the working cylinder 1.

When the piston rod 3 of the working cylinder 1 reaches its uppermost end position, it will turn to perform a slow stroke which is commenced by the valve 32 in the drainage conduit 16 being closed and valve 10 in the by-pass 9 being opened. In this manner a pressure equalization is achieved between the second side 5, i.e. the piston side, and the first side 4, i.e. the piston rod side of the working cylinder 1. Since the area of the piston 2 is greater on the piston side 5 than on the piston rod side 4, the piston 2 and piston rod 3 will be moved downwards as shown in FIG. 3, while hydraulic fluid flows backwards out of the working cylinder 1 through the conduit 6. This hydraulic fluid and hydraulic fluid in the supply conduit 8 will flow through the by-pass g, now open, but also through the conduit 29 to the high-pressure cylinder 13 so that its plunger 30 is forced in as the piston rod 31 and piston 19 are forced down in the receiving cylinder 12, resulting in emptying hydraulic fluid previously collected from the receiving cylinder 12 to the tank 18.

The high-pressure cylinder 13 and receiving cylinder 12 thus form a twin-operating pump unit to alternately empty hydraulic fluid under low pressure from the hydraulic system with the aid of hydraulic fluid under high pressure from the hydraulic system, and then restore hydraulic fluid under high pressure to the hydraulic system with the aid of hydraulic fluid under low pressure from the working cylinder 1. During the slow stroke of the working cylinder 1, illustrated in FIG. 3, hydraulic fluid under low pressure is more specifically pumped out of the receiving cylinder 12 to the tank 18 with the aid of the hydraulic fluid under high pressure which is simultaneously forced into the high-pressure cylinder 13 from the piston rod side 4 of the working cylinder 1 and the supply conduit 8. During the rapid stroke of the working cylinder 1, illustrated in FIGS. 1 and 2, hydraulic fluid under high pressure is pumped out of the high-pressure cylinder 13 to the piston rod side 4 of the working cylinder 1 with the aid of the hydraulic fluid under low pressure which is simultaneously forced into the receiving cylinder 12 from the piston side 5 of the working cylinder 1 via conduit 7 and the drainage conduit 16. The hydraulic fluid in the high-pressure cylinder 13 has the same pressure as that on the pressure side of the hydraulic system since the high-pressure cylinder 13 is all the time in open communication with the supply conduit 8, both during said slow stroke and during said rapid stroke. This pressure varies within a predetermined interval which is regulated by a control system influencing the pump so that this pumps hydraulic fluid into the hydraulic system immediately the pressure starts to fall.

The hydraulic fluid in the receiving cylinder 12 has an essentially lower pressure than in the high-pressure cylinder 13 since the former is on the drainage side of the hydraulic system and is in continuous open communication with the tank 18. Consequently, to enable emptying of the high-pressure cylinder 13 which contains hydraulic fluid under high pressure, the piston 19 in the receiving cylinder 12 must be given an area essentially greater than the area of the plunger 30 in the high-pressure cylinder 13. The ratio of this area is usually about 10:1–15:1, depending on the pressure conditions on the pressure side and drainage side of the hydraulic system.

In a practical example of the hydraulic system described above, operating a pressure diffuser, a pressure is maintained on the pressure side which may vary between 100 and 150 bar depending on the position and direction of movement of the piston 2 in the working cylinder 1. Generally this pressure may be from about 80 bar up to about 350 bar, and a preferred pressure interval is about 100–180 bar. The gas pressure in the gas chamber 21 is between 0.03 and 3 bar depending on the position of the piston 19 The emptying pressure on the hydraulic fluid in the receiving cylinder 12 is adjusted to vary between 5 and 10 bar. The area of the piston 19 is 1018 $cm^2$ and of the plunger 30 78.5 $cm^2$, corresponding to an area ratio of about 13:1.

Figure 4:
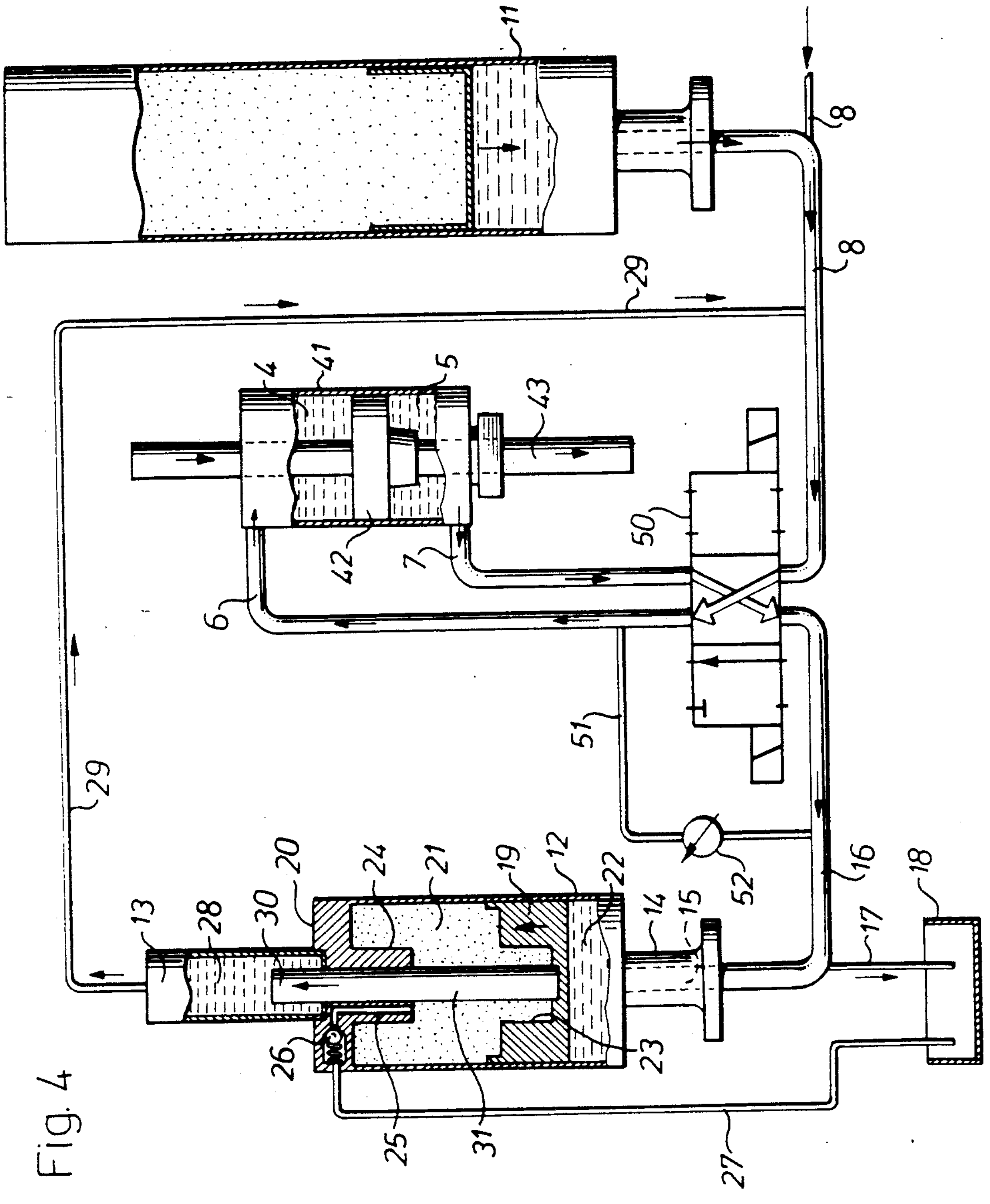
FIG. 4 is a diagram of connections for a hydraulic system according to a second application of a means in accordance with the present invention, and illustrates the flow directions when the piston rod of a working cylinder performs a rapid stroke.
Figure 5:
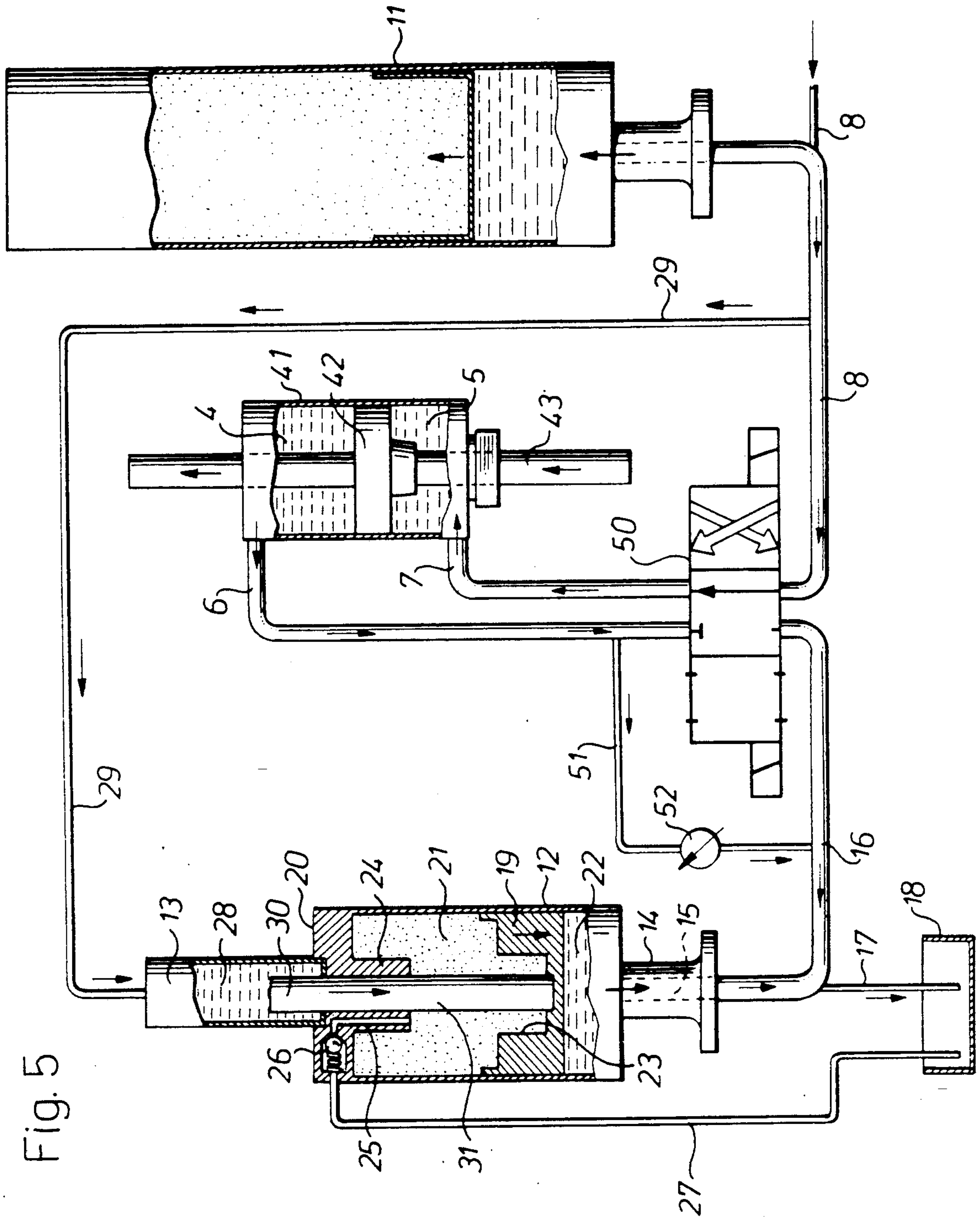
FIG. 5 shows the diagram of connections according to FIG. 4 and illustrates the flow directions when the piston rod performs its slow stroke in the opposite direction.

With reference to FIGS. 4 and 5, it is shown therein a diagram of connections for a hydraulic system according to a second application of the present invention. The same reference numerals are used for corresponding or similar parts as in the hydraulic system described above. The special means for receiving hydraulic fluid is the same as that described in connection with FIGS. 1–3. The hydraulic system comprises a working cylinder 41 in the form of a twin-operating hydraulic cylinder with through-running piston rod 43 arranged to perform a first rapid stroke (FIG. 4) and a second slow stroke (FIG. 5). The piston rod 43 supports a piston 42 dividing the working cylinder 41 into a first side 4 and a second side 5, the working cylinder 41 having a first conduit 6 connected to said first side 4, and a second conduit 7 connected to said second side 5. The supply conduit 8 is connected to a directional valve 50 to which the two conduits 6, 7 of the working cylinder 41 are also connected, as well as the drainage conduit 16, which is connected to the receiving cylinder 12. Further, a by-pass 51, provided with a valve 52, is disposed between the conduit 6 and drainage conduit 16. Valve 52 is preferably a proportional valve.

FIG. 4 shows the working cylinder 41 as its piston rod 43 performs its first, rapid stroke. The directional valve 51 is adjusted so that the supply conduit 8 is connected to the first side 4 of the working cylinder 41 via the conduit 6, while the second side 5 of the working cylinder 41 is connected to the receiving cylinder 12 via the conduit 7 and drainage conduit 16. Valve 52 in the by-pass 51 is closed. Hydraulic fluid flows in the directions indicated by arrows and is forced into the working cylinder 41 from the supply conduit 8 through the actions of the pump and the high-pressure accumulator 11, but also from the high-pressure cylinder 13 via the conduit 29 through the action of the plunger 30, which is in turn influenced mechanically by the piston 19 and piston rod 31 of the receiving cylinder 12 and hydraulically by the force against the piston 19 which is developed in the liquid space 22 of the receiving cylinder 12 by the hydraulic fluid being simultaneously pumped in from said second side 5 of the working cylinder 41.

When the piston rod 43 of the working cylinder 41 reaches its lowermost end position, it will turn to perform a slow stroke which is commenced by the valve 52 in the by-pass 51 being opened and the directional valve 50 being switched so that the supply conduit 8 is connected to the second side 5 of the working cylinder 41 via the conduit 7, while the first side 4 of the working cylinder 41 is connected to the tank 18 via the conduits 6, 51, 16 and 17. A pressure drop is thus effected on the first side 4 of the working cylinder 41 so that piston 42 can be moved upwards. At the same time hydraulic fluid in the supply conduit 8 will flow through pipe 29 to the high-pressure cylinder 13 so that its plunger 30 is forced in simultaneously as the piston rod 31 and piston 19 are forced down in the receiving cylinder 12, resulting in emptying hydraulic fluid previously collected from the receiving cylinder 12 to the tank 18.

The high-pressure cylinder 13 and receiving cylinder 12 thus form a twin-operating pump unit to alternately empty hydraulic fluid under low pressure from the hydraulic system with the aid of hydraulic fluid under high pressure from the hydraulic system, and then restore hydraulic fluid under high pressure to the hydraulic system with the aid of hydraulic fluid under low pressure from the working cylinder 41. During the slow stroke of the working cylinder 41, illustrated in FIG. 5, hydraulic fluid under low pressure is more specifically pumped out of the receiving cylinder 12 to the tank 18 with the aid of the hydraulic fluid under high pressure which is simultaneously forced into the high-pressure cylinder 13 from the supply conduit 8. During the rapid stroke of the working cylinder 41, illustrated in FIG. 4, hydraulic fluid under high pressure is pumped out of the high-pressure cylinder 13 to the supply conduit 8 with the aid of hydraulic fluid under low pressure which is simultaneously forced into the receiving cylinder 12 from the second side 5 of the working cylinder 41 via the conduit 7 and drainage conduit 16 and the directional valve 50.

That which is claimed is:

1. A means for receiving and subsequently emptying hydraulic fluid from a hydraulic system comprising a working cylinder; a supply conduit disposed between a pump and the working cylinder for supplying hydraulic fluid at high pressure within a predetermined interval; a receiving cylinder with a piston which on one side defines a space for the receipt of hydraulic fluid from said working cylinder with an emptying pressure essentially lower than said high pressure, and on the other side defines a chamber containing gas at low pressure; a high-pressure cylinder with a liquid space and a device movable therein to alter the liquid volume, said liquid space being connected to said supply conduit to receive and return hydraulic fluid at high pressure therefrom and thereto, respectively; and a piston rod disposed between said liquid volume altering device in said high-pressure cylinder and said piston in said receiving cylinder to transmit movements from said liquid volume altering device to said piston and reversed, the area of said piston in said receiving cylinder which is pressure-influenced by hydraulic fluid, being essentially greater than the area of said liquid volume altering device which is pressure-influenced by hydraulic fluid.

2. A means as recited in claim 1 wherein said piston of said receiving cylinder is provided with a central recess on its side located in said gas space, the end wall closing said gas space being provided with a corresponding throttle ring arranged to be received in said recess of the piston to contain, during pressure increase, hydraulic fluid leaking from the space in the receiving cylinder which is filled with hydraulic fluid, receiving cylinder which is filled with hydraulic fluid, and possibly from said liquid space of said high-pressure cylinder which is filled with hydraulic fluid.

3. A means as recited in claim 2 wherein a channel means extends through said throttle ring and said end wall for the removal of hydraulic fluid which has leaked out and collected in said piston recess.

4. A means as recited in claim 1 wherein said predetermined pressure interval for the hydraulic fluid supplied to said working cylinder has an upper limit value of about 350 bar, preferably about 100–180 bar; the gas pressure in said chamber of said receiving cylinder varies between 0.03 and 3 bar; the emptying pressure in the hydraulic fluid in said receiving cylinder is adjusted to vary between 5 and 10 bar; and wherein the ratio between said areas is about 1O:1-15:1, preferably about 13:1.

5. A means as recited in claim 1 wherein said piston rod of said working cylinder is connected to a movable screen means of a diffuser.

6. A means as recited in claim 1 wherein the hydraulic system comprises an accumulator.

7. A means as recited in claim 1 wherein said working cylinder consists of a differential cylinder.

8. A means as recited in claim 1 wherein said working cylinder consists of a twin-operating hydraulic cylinder with through-running piston rod.

9. A means as recited in claim 1 wherein said liquid volume altering device consists of a plunger.

10. A means as recited in claim g wherein said plunger and piston rod form a structural unit.

11. A means as recited in claim 10 wherein said piston rod abuts against said piston without any fixed mechanical connection existing therebetween.

* * * * *